United States Patent
Damato

(10) Patent No.: US 11,899,757 B2
(45) Date of Patent: Feb. 13, 2024

(54) SYSTEMS AND METHODS FOR TEMPORARY DIGITAL CONTENT SHARING

(71) Applicant: Cox Automotive, Inc., Atlanta, GA (US)

(72) Inventor: Robert Christopher Damato, East Northport, NY (US)

(73) Assignee: COX AUTOMOTIVE, INC., Atlanta, GA (US)

(*) Notice: Subject to any disclaimer, the term of this patent is extended or adjusted under 35 U.S.C. 154(b) by 390 days.

(21) Appl. No.: 17/110,001

(22) Filed: Dec. 2, 2020

(65) Prior Publication Data

US 2021/0165859 A1  Jun. 3, 2021

Related U.S. Application Data

(60) Provisional application No. 62/942,302, filed on Dec. 2, 2019.

(51) Int. Cl.
- *G06F 21/12* (2013.01)
- *G06F 16/955* (2019.01)
- *G06F 21/10* (2013.01)

(52) U.S. Cl.
CPC .......... *G06F 21/128* (2013.01); *G06F 16/955* (2019.01); *G06F 21/1014* (2023.08); *G06F 2221/2137* (2013.01); *G06F 2221/2141* (2013.01); *G06F 2221/2145* (2013.01); *G06F 2221/2153* (2013.01)

(58) Field of Classification Search
CPC ................. G06F 21/128; G06F 16/955; G06F 2221/0711; G06F 2221/2137; G06F 2221/2141; G06F 2221/2145; G06F 2221/2153; G06F 21/34; G06F 21/35; G06F 21/6209

See application file for complete search history.

(56) References Cited

U.S. PATENT DOCUMENTS

| | | | | |
|---|---|---|---|---|
| 7,653,001 | B2* | 1/2010 | Agrawal | H04L 67/56 370/252 |
| 8,281,232 | B2* | 10/2012 | Vishria | G06F 16/9566 715/208 |
| 9,008,651 | B2* | 4/2015 | Kun-Szabo | H04W 76/10 455/414.1 |
| 9,010,622 | B2* | 4/2015 | Kim | G06F 16/9554 235/375 |
| 9,203,874 | B2* | 12/2015 | Kadishay | H04L 65/1093 |
| 9,578,186 | B2* | 2/2017 | Kusaka | G06F 3/041 |
| 9,883,234 | B2* | 1/2018 | Coburn, IV | H04L 65/612 |

(Continued)

*Primary Examiner* — David Garcia Cervetti

(74) *Attorney, Agent, or Firm* — Eversheds Sutherland (US) LLP

(57) ABSTRACT

Systems and methods are provided herein for temporary digital content sharing. The systems and methods may involve receiving, from a first device, a selection of a first element associated with a first URL. The systems and methods may also involve determining first content associated with the first URL. The systems and methods may also involve receiving, from the first device, a selection of a second device at which to display the first content associated with the first URL. The systems and methods may also involve providing the first URL to the second device, wherein the URL allows access to the content by the second device.

14 Claims, 12 Drawing Sheets

(56) References Cited

U.S. PATENT DOCUMENTS

| | | | |
|---|---|---|---|
| 10,026,108 B2* | 7/2018 | Jackson | H04L 67/75 |
| 10,031,678 B2* | 7/2018 | Jeong | G06F 3/0658 |
| 10,284,369 B2* | 5/2019 | Wagner | H04L 9/0822 |
| 10,362,066 B2* | 7/2019 | Tipton | H04L 67/52 |
| 10,476,831 B2* | 11/2019 | Thomson | H04L 67/54 |
| 11,006,187 B2* | 5/2021 | Ryu | H04N 21/44227 |
| 11,218,367 B2* | 1/2022 | McEntee | G06F 16/1873 |
| 11,432,129 B2* | 8/2022 | Srivatsa | H04L 67/104 |
| 11,592,906 B2* | 2/2023 | Monnerat | G06F 3/1423 |
| 2001/0016873 A1* | 8/2001 | Ohkado | G06F 16/958 707/E17.116 |
| 2004/0181490 A1* | 9/2004 | Gordon | G06F 21/10 705/59 |
| 2005/0120211 A1* | 6/2005 | Yokoyama | G06F 21/335 713/168 |
| 2007/0157072 A1* | 7/2007 | LaBiche | G11B 27/322 707/E17.112 |
| 2008/0301444 A1* | 12/2008 | Kim | H04L 63/126 713/169 |
| 2009/0119602 A1* | 5/2009 | Nishiyama | G06F 21/31 715/753 |
| 2010/0005517 A1* | 1/2010 | Foti | H04N 21/64322 726/6 |
| 2010/0030868 A1* | 2/2010 | Okamoto | H04N 21/435 715/764 |
| 2010/0146597 A1* | 6/2010 | Tanaka | G06F 16/958 709/219 |
| 2010/0228989 A1* | 9/2010 | Neystadt | G06F 21/6209 713/185 |
| 2011/0055329 A1* | 3/2011 | Abt, Jr. | G06F 16/958 709/205 |
| 2011/0313922 A1* | 12/2011 | Ben Ayed | H04W 4/80 705/42 |
| 2012/0210379 A1* | 8/2012 | McCoy | H04N 21/64322 725/109 |
| 2012/0284176 A1* | 11/2012 | Svendsen | G11B 27/031 715/753 |
| 2013/0089192 A1* | 4/2013 | Citron | H04L 65/1104 379/93.17 |
| 2013/0125185 A1* | 5/2013 | Jana | H04N 21/2668 725/109 |
| 2013/0173754 A1* | 7/2013 | van Os | H04L 67/02 709/219 |
| 2013/0196590 A1* | 8/2013 | Fyke | G06F 21/305 455/3.01 |
| 2014/0113602 A1* | 4/2014 | Six | H04L 65/70 455/414.4 |
| 2014/0123033 A1* | 5/2014 | Uhma | H04L 67/01 715/753 |
| 2014/0143672 A1* | 5/2014 | Kim | H04L 12/1827 715/733 |
| 2014/0170978 A1* | 6/2014 | Wolman | G06F 3/1454 455/41.2 |
| 2014/0189479 A1* | 7/2014 | Glennon | G06F 16/958 715/205 |
| 2014/0207566 A1* | 7/2014 | Kamran | H04L 67/1095 705/14.55 |
| 2014/0245185 A1* | 8/2014 | Knodt | H04L 65/4046 715/753 |
| 2014/0279123 A1* | 9/2014 | Harkey | G06Q 30/0619 705/26.1 |
| 2014/0282077 A1* | 9/2014 | Wilson | G06F 40/166 715/826 |
| 2014/0364092 A1* | 12/2014 | Rose | G06F 16/433 455/414.1 |
| 2015/0143442 A1* | 5/2015 | McCoy | H04N 21/4122 725/110 |
| 2015/0149777 A1* | 5/2015 | Kim | H04W 12/069 713/169 |
| 2015/0200936 A1* | 7/2015 | Kim | H04L 63/0853 713/171 |
| 2015/0213238 A1* | 7/2015 | Farha | H04L 63/101 726/30 |
| 2015/0222615 A1* | 8/2015 | Allain | H04L 67/55 726/4 |
| 2015/0256352 A1* | 9/2015 | Yang | H04L 67/147 715/753 |
| 2016/0044122 A1* | 2/2016 | Sandholm | H04W 4/06 709/206 |
| 2016/0066184 A1* | 3/2016 | Bhargav-Spantzel | H04L 63/105 726/7 |
| 2016/0149918 A1* | 5/2016 | Chai | H04L 63/10 726/4 |
| 2016/0191621 A1* | 6/2016 | Oh | H04L 67/1095 709/205 |
| 2016/0212178 A1* | 7/2016 | Zhang | H04L 65/403 |
| 2016/0241609 A1* | 8/2016 | Xin | G06F 3/0484 |
| 2016/0294905 A1* | 10/2016 | Agro | H04N 21/4227 |
| 2016/0316032 A1* | 10/2016 | Brunn | H04W 4/21 |
| 2016/0330574 A1* | 11/2016 | Wuts | H04W 76/15 |
| 2017/0078343 A1* | 3/2017 | Qiu | H04L 65/1093 |
| 2017/0083487 A1* | 3/2017 | Wang | G06F 40/117 |
| 2017/0131855 A1* | 5/2017 | Svendsen | H04N 21/47205 |
| 2017/0171285 A1* | 6/2017 | Shu | G06F 3/0485 |
| 2017/0178592 A1* | 6/2017 | Dow | G09G 5/12 |
| 2017/0201852 A1* | 7/2017 | Kuang | H04W 12/06 |
| 2017/0322762 A1* | 11/2017 | Duong | B43L 1/00 |
| 2017/0324559 A1* | 11/2017 | Hu | H04W 12/50 |
| 2018/0011679 A1* | 1/2018 | Sugioka | G09G 5/006 |
| 2018/0039698 A1* | 2/2018 | Lewis | G06Q 30/0201 |
| 2018/0053176 A1* | 2/2018 | Rawat | G06Q 20/3278 |
| 2018/0098028 A1* | 4/2018 | Mu | H04N 21/2187 |
| 2018/0196885 A1* | 7/2018 | Kim | G06F 16/9566 |
| 2018/0253148 A1* | 9/2018 | Santamaria | H04L 67/1095 |
| 2019/0114365 A1* | 4/2019 | Liu | G06K 19/06037 |
| 2019/0121913 A1* | 4/2019 | Singh | G06F 16/9554 |
| 2019/0132654 A1* | 5/2019 | Hu | H04N 21/23418 |
| 2019/0147426 A1* | 5/2019 | Kieffer | G06Q 20/3224 705/17 |
| 2019/0213318 A1* | 7/2019 | Gnanasekaran | H04W 12/06 |
| 2019/0265941 A1* | 8/2019 | Baba | G06F 16/955 |
| 2019/0373316 A1* | 12/2019 | Yu | H04N 21/26216 |
| 2020/0043097 A1* | 2/2020 | Aznaurashvili | G06Q 50/265 |
| 2020/0074356 A1* | 3/2020 | Tseng | G06Q 20/045 |
| 2020/0137143 A1* | 4/2020 | Sun | G06F 16/9566 |
| 2020/0142930 A1* | 5/2020 | Wang | G06F 18/23213 |
| 2020/0170057 A1* | 5/2020 | Rakshit | G06F 3/165 |
| 2020/0293178 A1* | 9/2020 | Kumar | G06F 3/013 |
| 2021/0037339 A1* | 2/2021 | Ornelas | G01S 5/0284 |
| 2021/0092176 A1* | 3/2021 | Schneider | H04N 21/6587 |
| 2021/0097125 A1* | 4/2021 | Khanna | H04L 67/02 |
| 2021/0136129 A1* | 5/2021 | Ponnusamy | G06F 3/1423 |
| 2021/0136130 A1* | 5/2021 | Ponnusamy | H04L 12/1822 |
| 2021/0149997 A1* | 5/2021 | Sugita | G06T 1/0007 |

* cited by examiner

US 11,899,757 B2

SYSTEMS AND METHODS FOR TEMPORARY DIGITAL CONTENT SHARING

TECHNICAL FIELD

The present disclosure relates to systems and methods for temporary digital content sharing.

BACKGROUND

Different companies may have a wide variety of software platforms that they leverage. In one particular example, car dealers may utilize multiple software platforms during the in-showroom car selling process. They may also utilize multiple mechanisms for presenting information to a user (for example, a car buyer) (paper, digital signing, iPads, second screens, desk size displays, etc.). The use of these multiple mechanisms may lead to unnecessary complexities.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
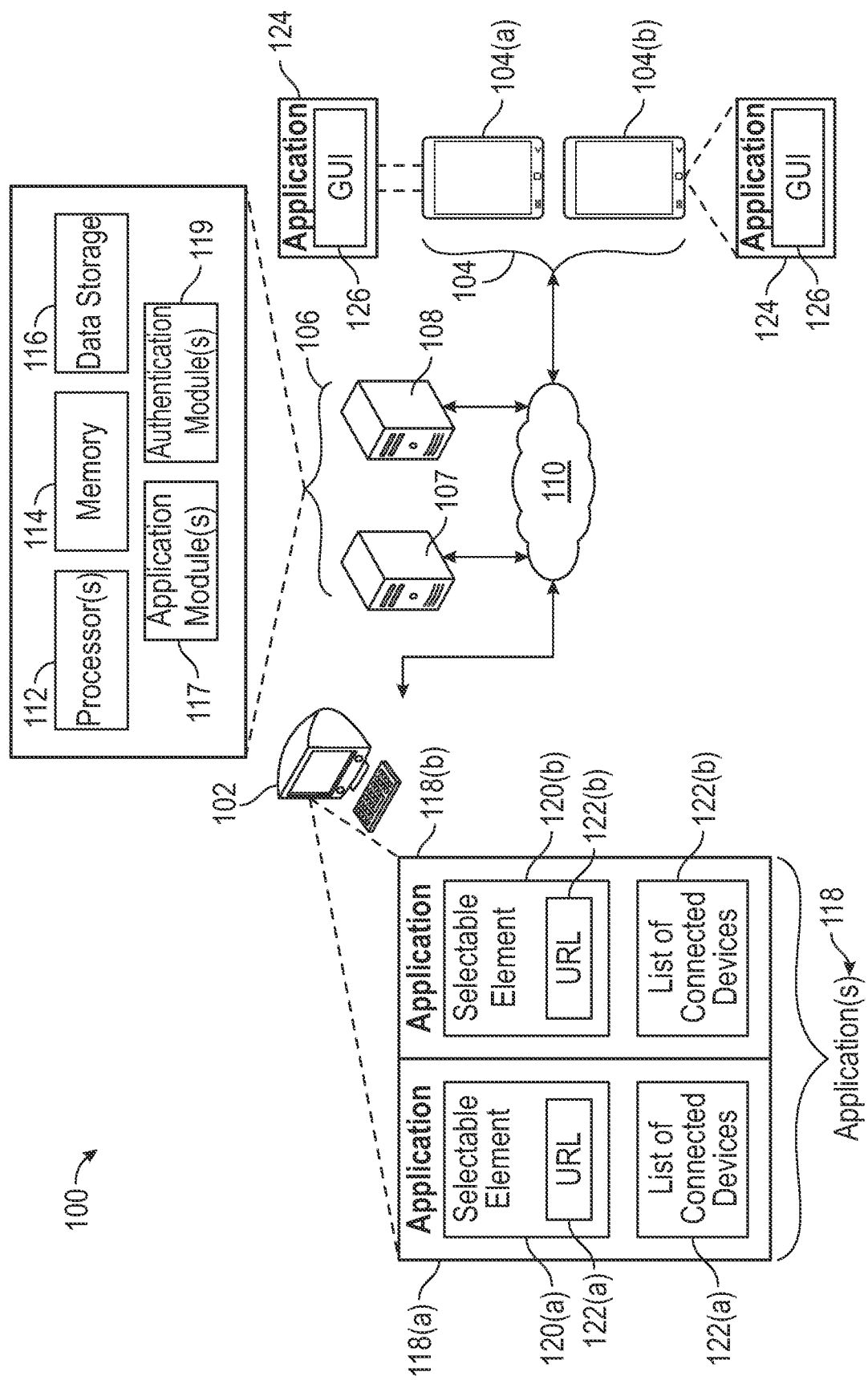
FIG. 1 depicts a system architecture, in accordance with one or more example embodiments of the disclosure.

The disclosure is directed to systems and methods for temporary digital content sharing. In some embodiments, the digital content sharing as disclosed herein may involve the capability of a host device (for example, a dealer computer at a vehicle dealership or a host device associated with a web-based vehicle sales service) to "push" digital documents and/or other types of files to one or more connected devices (for example consumer-facing devices at the dealership). That is, the "pushing" of digital documents and/or other types of files may entail the host device selecting a particular connected device on which the files should be presented, and subsequently transmitting those documents to the connected device so that they may be viewed on the connected device. Continuing the above example, a dealer may "push" documents associated with a vehicle sale to a customer device so that the customer device may view and/or sign the documents. The files may be stored at the host device or at a remote server, and upon selection of a connected device at a host device, an application on the connected device may provide a "window" to the file on the host device and/or remote server. That is, the file may not actually be sent to the connected device, but may rather be maintained on the host device and/or remote server and merely presented to the connected device from the host device and/or remote server. In some instances, however, the file itself may also be sent from the host device and/or remote server to the connected device. The systems and methods described herein may provide a benefit of a single platform capable of selectively presenting customized content to a connected device. While a vehicle dealership is provided as an example, this disclosure may be equally applicable in any context in which digital content may be presented at once device at the instruction of another device. Additionally, terms such as "file," "document," "content," among others, may be used interchangeably herein to refer to any information in any form that may be presented on the connected device. Finally, it should be noted that while the term "connected device" may be used herein, this term may also refer to any device that is not yet connected to a host device as well. Furthermore, while reference may be made to a connected device or a host device performing certain operations herein, any of the operations may likewise be applicable to either device in some instances (for example, operations described as being associated with a host device may also be associated with a connected device, and vice versa).

In some embodiments, a user controlling the host device may be able to select the content to be pushed to any of the devices connected to the host device through a selectable element located on the user interface of an application of the host device. For example, the selectable element may be a button that the user may select (e.g., press on a touch screen, click using a mouse cursor, etc.). The selectable element may be associated with a particular URL, which may include information that allows content, such as a document, video, or any other type of file, to be presented on the connected device. The file may be located remotely (for example, at a remote server) or may be local to the host device. The selectable element may also present a list of connected devices to which the user may direct or push the file associated with the URL. This may be, for example, in the form of a drop-down list from the selectable element. However, the list of connected devices may also be presented in any other format. Once the particular connected device is selected, the content may be pushed to the selected connected device so that the content may now be presented to the selected connected device. The user in control of the connected device (for example, a customer purchasing a vehicle) may then interact with the content. While the content is displayed on the connected device, the content itself may not actually be sent to the connected device, but rather an application on the connected device may serve as a "window" to the remotely-located content. The content may be provided to any number of connected devices, and the content may also be "pulled" from any of the connected devices by the user controlling the host device. That is, "pulling" content may refer to ceasing presentation of the content on the connected device (for example, a vehicle dealer may be presenting a loan document to a user in control of a connected device, and the dealer may choose to "pull" the loan document from the connected device so that it is no longer being presented to the user). Once the content is pulled from a connected device, the device may revert to a default home user interface. Once the content is pulled, any changes made to the content by the connected device user may be saved to the file (for example, the file on the server may now include the changes). It should also be noted that, in some instances, content may be pushed to multiple different connected devices at once. The content provided to these multiple devices may be the same content or different content. That is, different content may be provided to individual connected devices.

In some instances, additional devices may also be registered as connected devices with the host device. To register a new device as a new connected device, the user controlling the host device may select an "add new device" option (or alternatively may provide any other type of indication that a new device should be registered). A pairing code may be generated by a server and displayed on the connected device when the connected device attempts to connect to the server. When the user on the host device selects "add a new device," they will be prompted to enter the connected device's current pairing code on the host device. The pairing code may be any string of characters, numerical values, etc. This pairing code may be entered at the host device. Once the pairing code is verified, the device may be registered with the host device. The device may now be included within the list of connected devices that the user in control of the host device may push a file associated with a URL to.

In some embodiments, a number of additional capabilities may be provided for interactions between one or more host devices and one or more connected devices. For example, one additional feature may involve the ability of the user controlling the host device to view current connected device statuses. This may allow the user associated with the host device to track which content is provided to any individual connected device at any given time. This may also be beneficial if there are multiple host devices connected to the same connected devices. The user in control of one particular host device may be able to see when the user in control of another particular host device is interacting with a connected device shared between the two host devices. Another additional feature may include built-in annotation capabilities. That is, the user in control of the connected device may be able to edit and/or provide comments on the content being displayed at the connected device. The edits and/or comments may be reflected not just in the display of the connected device, but also in the actual content itself if it is stored at a remote location and simply being projected to the connected device. In some instances, such annotation capabilities may also be provided to the host device, such that the host device and the connected device may both edit content being presented to the connected device simultaneously. Another example of an additional related feature may include the ability of the host device to remotely view the connected device's display. Another example of an additional feature may include the ability of the user of the connected device to perform a remote signature of a document. Another example additional feature may include enabling a video conference session or chat session between the host device and the connected device.

Illustrative Embodiments

Turning now to the drawings, FIG. 1 depicts an illustrative system 100 in which techniques and structures of the present disclosure may be implemented. The illustrative system 100 may include one or more host devices 102, one or more connected devices 104 (for example, connected device 104(a) and connected device 104(b)) (for simplicity, connected device 104(a), connected device 104(b), and any number other connected device may simply be referred to as "connected device 104" herein), and one or more servers 106 (e.g., server 107 and server 108), and a communications network 110.

In some embodiments, a host device 102 may include any type of device (for example, a salesperson's computer at a vehicle dealership) that is connected to one or more different connected devices (for example, a customer-facing device at a vehicle dealership), and is able to push content from any number of sources, both local and remote, to the one or more connected devices. That is, a host device 102 may be a device that controls the content that is displayed at the one or more connected devices 104. The host device 102 may include one or more application(s) 118 (for example, application 118(a) or application 118(b)). An application 118 may be an application that is local to the host device 102, may be an internet browser page, or may exist in any other form. Additionally, the application may serve any number of purposes, such as, for example, accounting, vehicle sales, loan processing, or any number of other possible application types. Furthermore, the host device 102 may include any number of applications 118 of any form and/or type. In some instances, the application may also include one or more selectable elements 120. The selectable element may be a selectable icon or Graphical User Interface (GUI) feature associated with the application 118 on the host device. For example, the selectable element 120 may be a clickable button on the GUI of the application 118. Any number of selectable elements 120 may be included within a given application 118, and each selectable element 120 may also include different information, such as different URLs. The selectable elements may be associated with a URL that points to a piece of content that may be displayed at the connected device 104. Additionally, the host device 102 may include a list of connected devices 104 that are registered with the host device 102 and that the host device 102 is able to push content to.

In some embodiments, a connected device 104 may be any type of device that is capable of receiving and/or displaying content from one or more host devices 102. As mentioned above, one example may be a customer-facing device, such as a tablet, smart phone, desktop computer, or laptop computer, at a vehicle dealership or connected to a web-based vehicle sales service. Any number of potential other examples exist, however. The connected device 104 may be connected to one or more host devices 102 and may be capable of displaying content that is located remotely to the connected device 104 (for example, content that is stored at the host device 102 or the servers 106). The content may be displayed on the connected device 104 through an application 124 on the connected device 104. The application 124 on the connected device 104 may include a GUI 126 for presenting the content. The application 124 may be may be local to the connected device 104, may be an internet browser page, or may be in any other form.

In some embodiments, content may be presented on the connected 104 device based on an action taken at the host device 102. For example, the content may be displayed at the connected device 104 upon selection of the connected device 104 from the list on the host device application 118 that may be associated with a particular selectable element 120 on the host device 102. The particular selectable element 120 on the host device 102 may be associated with a URL that includes information, such as a pointer to content located on the host device 102, the servers 106, or any other location. Upon selection of the connected device 104 on the host device application 118, the content being pointed to in the URL, or access to this content, may be provided to the connected device 104 (for example, as shown on connected device 104(b)). In some instances, the content may not be sent to the connected device 104 (for example, when a document is being presented on the connected device 104, the document itself may not have been sent to the connected device, but rather the connected device 104 may be viewing the document still located on the host device 102 and/or server 106 through the application on the connected device 104), In some instances; however, the content itself may alternatively be sent to the connected device 104.

In some embodiments, the content may also be "pulled" from the connected device 104 at any time by the host device 102. That is, "pulling" content may refer to ceasing presentation of the content on the connected device (for example, a vehicle dealer may be presenting a loan document to a user in control of a connected device, and the dealer may choose to "pull" the loan document from the connected device so that it is no longer being presented to the user). Once the content is pulled from a connected device, the device may revert to a default home user interface (for example, as shown on connected device 104(a). Additionally, once the content is pulled, any changes made to the content by the connected device user may be saved to the file (for example, the file on the server may now include the changes). When content is not being displayed on the connected device 104, a default user interface may be displayed (as depicted in 101). The default user interface may also be displayed when content is pulled from the connected device 104.

In some embodiments, the one or more servers 106 may be responsible for a number of different functionalities associated with the digital content sharing between a host device 102 and a connected device 104. For example, the one or more servers 106 may be used to facilitate communications between the devices, may be used to store content that is transmitted between devices, and/or may be used to store known connections between specific devices, among other functionalities. As one specific non-limiting example, FIG. 1 may depict the one or more servers 106 as including at least server 107 and server 108. The server 107 may include a platform responsible for managing the combined functionality of the system 100. For example, the selection of the selectable element 120 may cause information stored in the URL associated with the selectable element 120 to be provided to the server 107. The server may then determine which on the server 108 is pointed to based on information in the URL, and may facilitate the presenting of that content to the connected device 104.

In some embodiments, the server 108 may have stored some or all of the content that is being presented on the connected device 104. That is, the URLs associated with the selectable elements 120 on the host device 102 may point to the content stored on the server 108. Any changes to any content (for example, editing a document) may be reflected in the content stored on the server 108.

In some embodiments, any of the functionality of the server 107 and the server 108 may all be performed on either the server 107 and/or the server 108. That is, the system 100 may be implemented using only one server instead of the two servers 107 and 108 (or any other number of servers). Additionally, any number of combinations and/or configurations of the various elements of the system 100 (for example, the host device 102, connected device 104, and servers 106) may be possible. In some instances, the one or more servers 106 may also host the computing platform described with respect to FIGS. 4-5 and/or the authentication and/or authorization system described with respect to FIGS. 2A-2B, as well as any other system described herein.

Any of the elements of the system 100 (for example, the host device 102, connected device 104, and servers 106) may include one or more processors 112 that may include any suitable processing unit capable of accepting digital data as input, processing the input data based on stored computer-executable instructions, and generating output data. The computer-executable instructions may be stored, for example, in the data storage 118 and may include, among other things, operating system software and application software. The computer-executable instructions may be retrieved from the data storage 116 and loaded into the memory 114 as needed for execution. The processor 112 may be configured to execute the computer-executable instructions to cause various operations to be performed. Each processor 112 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 116 may store program instructions that are loadable and executable by the processors 112, as well as data manipulated and generated by one or more of the processors 112 during execution of the program instructions. The program instructions may be loaded into the memory 114 as needed for execution. The memory 114 may be volatile memory (memory that is not configured to retain stored information when not supplied with power), such as random access memory (RAM) and/or non-volatile memory (memory that is configured to retain stored information even when not supplied with power), such as read-only memory (ROM), flash memory, and so forth. In various implementations, the memory 114 may include multiple different types of memory, such as various forms of static random access memory (SRAM), various forms of dynamic random access memory (DRAM), unalterable ROM, and/or writeable variants of ROM, such as electrically erasable programmable read-only memory (EEPROM), flash memory, and so forth.

Various program modules, applications (for example, application 118 on the host device 102, application 124 on the connected device 104, the application module(s) 117, and/or the authentication module(s) 119 at the server 106), or the like may be stored in data storage 124 that may comprise computer-executable instructions that when executed by one or more of the processors 112 cause various operations to be performed. The memory 114 may have loaded from the data storage 116 one or more operating systems (O/S) that may provide an interface between other application software (for example, dedicated applications, a browser application, a web-based application, a distributed client-server application, etc.) executing on the server 106 and the hardware resources of the server 106. More specifically, the O/S may include a set of computer-executable instructions for managing the hardware resources of the server 106 and for providing common services to other application programs (for example, managing memory allocation among various application programs). The O/S may include any operating system now known or which may be developed in the future including, but not limited to, any mobile operating system, desktop or laptop operating system, mainframe operating system, or any other proprietary or open-source operating system.

Any of the document host devices 102, connected devices 104, and servers 106, may be configured to communicate with each other and any other component of the system 100 via one or more communication networks 110. The communication network 110 may include, but is not limited to, any one or a combination of different types of suitable communications networks such as, for example, cable networks, public networks (for example, the Internet), private networks, wireless networks, cellular networks, or any other suitable private and/or public networks. Further, the communication network 110 may have any suitable communication range associated therewith and may include, for example, global networks (for example, the Internet), metropolitan area networks (MANs), wide area networks (WANs), local area networks (LANs), or personal area networks (PANs). In addition, the communication network 110 may include any type of medium over which network traffic may be carried including, but not limited to, coaxial cable, twisted-pair wire, optical fiber, a hybrid fiber-coaxial (HFC) medium, microwave terrestrial transceivers, radio frequency communication mediums, satellite communication mediums, or any combination thereof.

In some instances, any of the elements described with respect to system 100 (such as the one or more host devices, the one or more connected devices 104, and/or the one or more servers 106), as well as any other elements described herein, may also include any aspects of the example computing device 900 described with respect to FIG. 9 below.

Figure 2A:
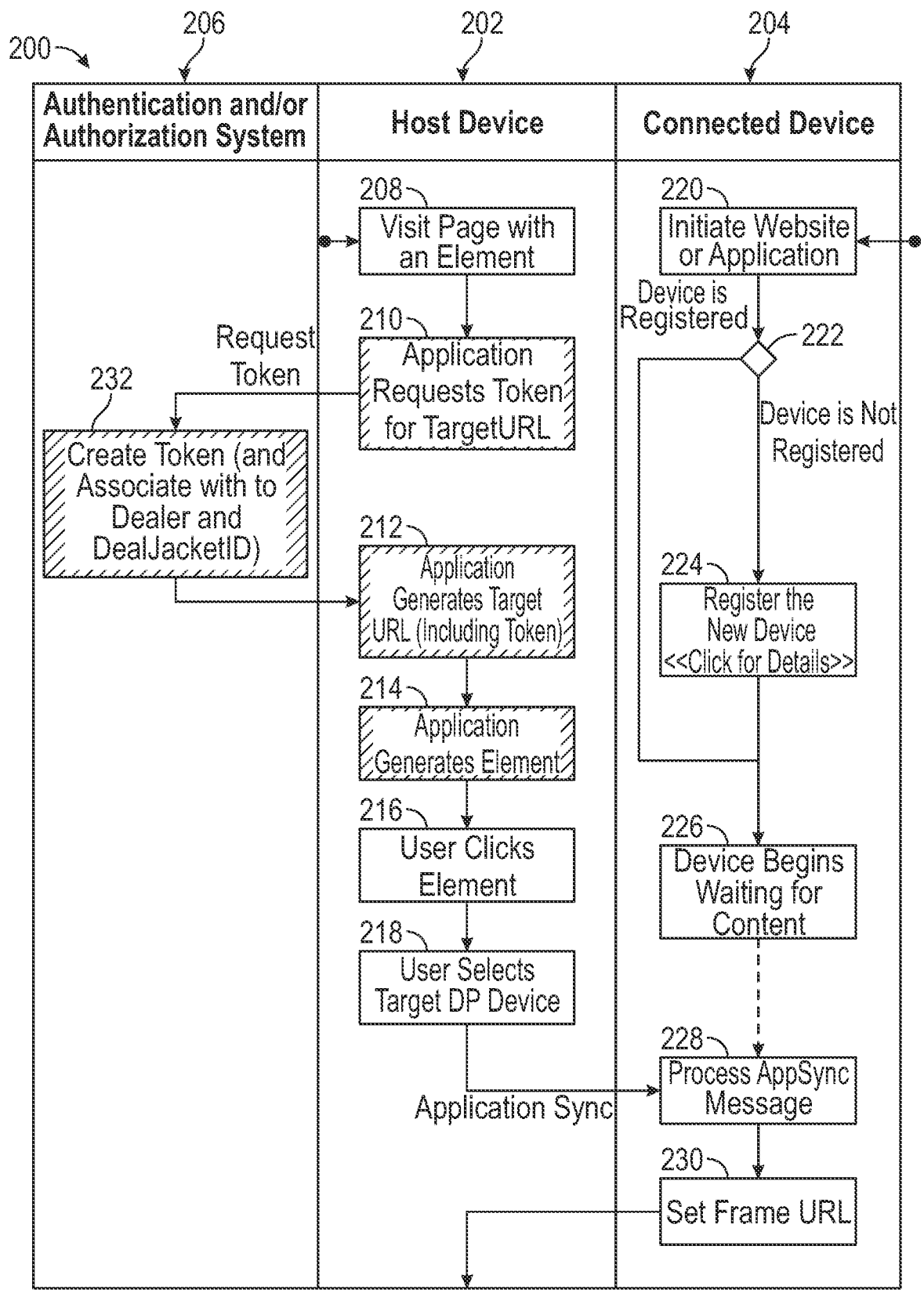
FIG. 2A depicts a system flowchart, in accordance with one or more example embodiments of the disclosure.

FIG. 2A depicts a system flowchart 200, which may involve a process flow for receiving and displaying content at a connected device (or multiple connected devices) based on a selection of the connected device at the host device. The system flowchart 200 may include three different elements in interaction with one another. In some embodiments, any number of other elements may interact (for example, less or more than three elements). A first element may include an authentication and/or authorization system. A second element may include a host device (for example, this may be the same as the host device 102 referenced with respect to FIG. 1). A third element may include a connected device (for example, this may be the same as the connected device 104 referenced with respect to FIG. 1). The system flowchart 200 may depict the various interactions that these three elements may undergo in performing a digital content sharing session as described herein. As such, the flowchart 200 may include three sub-flows, including at least a first sub-flow 202 associated with the host device, a second sub-flow 204 associated with the connected device, and/or a third sub-flow associated with the authentication and/or authorization system.

In some embodiments, the first sub-flow 202 (for example, the sub-flow associated with the host device) may begin with operation 208, which may involve a user visiting a webpage. In some embodiments, the user may alternatively initiate a software application instead of visiting a webpage (it should be noted that in this regard, the digital content sharing described herein may be performed on any number of mediums, such as the application or webpage mentioned above). The webpage or application may be associated with one or more URLs that may point to one or more objects. The objects may include, for example, any type of file, webpage, or other source of content, such as a document, video, etc. In one particular use case, the URL may be associated with any type of document involved with completing a vehicle sale at a vehicle dealership. Following operation 208, the first sub-flow 202 at the host device may proceed to operation 210, which may involve the website or software application requesting a token for the URL. For example, the token may be an OAuth, as well as any other type of authentication token. This token may be created by the authentication and/or authorization system as part of operation 232 of the third sub-flow 206 associated with the authentication and/or authorization system. In some instances, the token may also be created by any other element depicted in flowchart 200 or otherwise as opposed to being created by the authentication and/or authorization system. Additionally, continuing with the above use case, the token may be associated with the vehicle dealership. The first sub-flow 202 may then proceed with operation 212, which may involve the website or application generating a target URL, including the token (if necessary). That is, the token may then be added to the URL. Once the URL is completed (for example, the token and any other necessary information is added), at operation 214, an element may be generated and rendered at the host device. The element may be in the form of a selectable button, or any other types of interactive element, that a user may select to trigger the URL associated with the object. The element may also allow the user to select a connected from a drop-down list of connected devices (the list of connected devices may also alternatively be separate from the selectable element). At operation 216, the host device may receive a user selection of the element generated in conjunction with operation 214. For example, if the element is a button on the website or application, the user may select the button on the host device. Once the selection occurs, the object associated with the URL may be displayed on the selected connected device. Finally, sub-flow 202 may involve the user selecting a target device to provide content to (for example, the connected device referenced with respect to the second sub-flow 204). Continuing the above use case, the user referred to with respect to the first sub-flow 202 may be a salesman at the vehicle dealership who intends to provide documentation through the host device to the connected device for presentation to a customer at the vehicle dealership.

In some embodiments, the second sub-flow 204 (for example, the sub-flow associated with the connected device) may begin with operation 220, which may involve initiating the website or application at the connected device. Upon initiation, a determination may be made at condition 222 as to whether the connected device is registered with the associated host device (that is, if the connected device is included in the list of connected devices already associated with the host device). If not, then a registration process for registering the connected device with the host device may be performed at operation 224. The device registration process may be described in more detail with reference to FIGS. 3A and 3B below. If the connected device is determined to already be registered with the host device, then the connected device may enter a default user interface screen that initially may not include any documents or other types of files being displayed (as content may not yet have been pushed to the connected device by the host device). During this time, and at operation 226, the connected device may remain in a waiting phase in which the connected device is waiting for content to be provided by the host device. Following operation 226, the second sub-flow 204 may proceed to operation 228, which may involve processing a synchronization message received from the host device. The synchronization message may be transmitted to the connected device as a result of the user selecting the connected device as a target device at the host device in operation 218 of sub-flow 202 associated with the host device. Following operation 228, operation 230 may involve the connected device requesting the content URL.

Figure 2B:
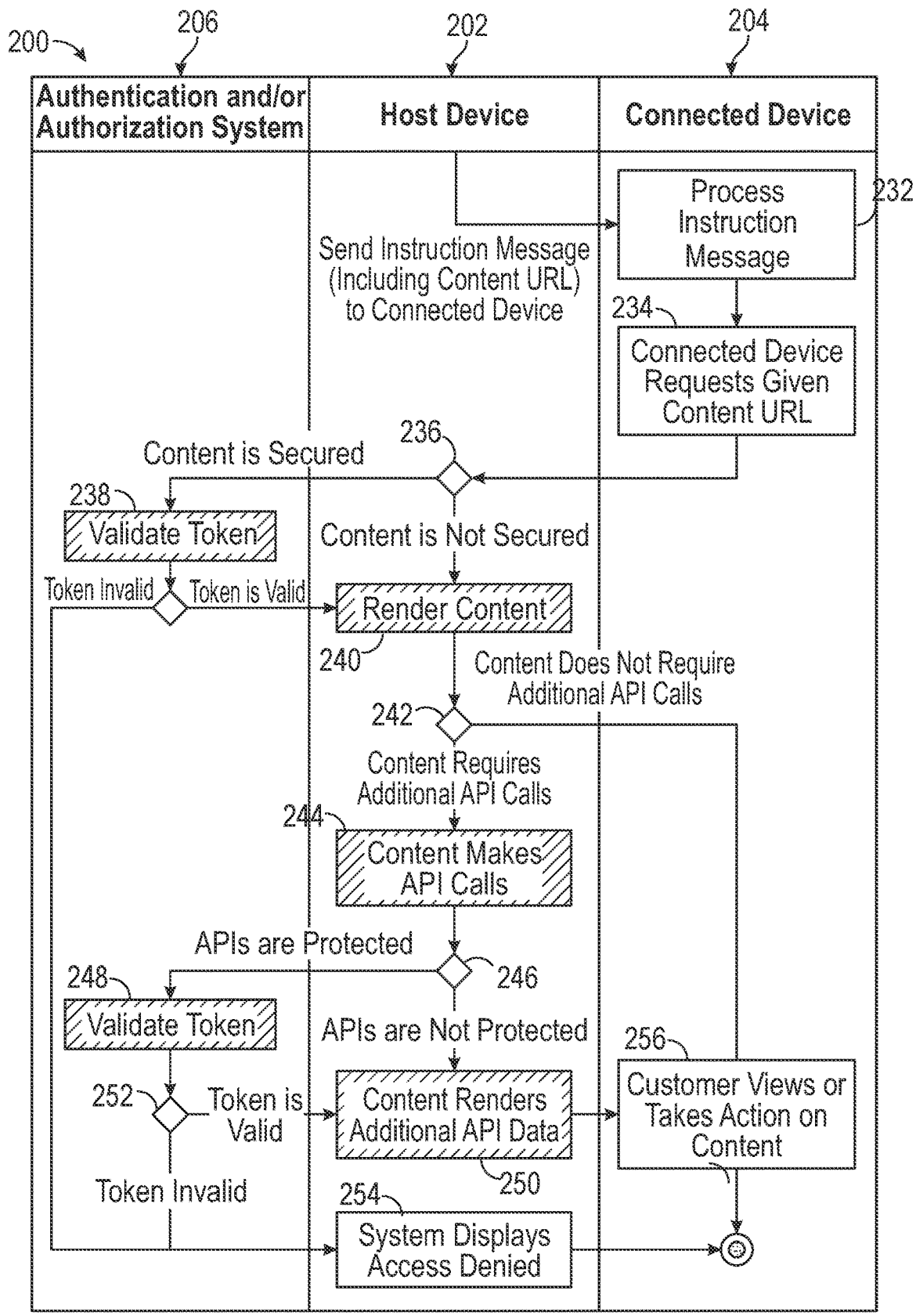
FIG. 2B depicts a continuation of the system flowchart depicted in FIG. 2A, in accordance with one or more example embodiments of the disclosure.

Continuing with FIG. 2B (which may depict a continuation of flowchart 200), the host device, at operation 232, may process an instruction message from the host device. Following operation 234, the flowchart 200 may proceed to operation 234, which may involve the connected device requesting one or more content URLs from the host device. Following operation 234 may be a condition 236. The condition 236 may involve determining whether the content is secured or not. If it is determined that the content is secured, then the flowchart 200 may proceed to operation 238. If it is determined that the content is not secured, then the flowchart 200 may proceed to operation 240. Operation 238 may involve performing validation of a security token. Operation 238 may also be associated with a condition involving a determination that the token is valid. If the token is determined to be valid, then the flowchart 200 proceeds to operation 240. However, if the token is invalid, then the flowchart proceeds to operation 254, involving displaying of an access denied message. Operation 240 may involve rendering the content. Associated with the operation 240 may be a condition 242, which may determine if the content requires additional API calls. If the content does not require additional API calls, then the flowchart 200 proceeds to operation 256. If, however, the content does require additional API calls, then the flowchart 200 proceeds to operation 244. Operation 244 may involve the content making the additional API calls. Following operation 244 may be a condition 246. The condition 246 may involve a determination as to whether the APIs are protected. If the APIs are protected, then the flowchart 200 proceeds to operation 248, which may also involve token validation. Once the token is validated, then the flowchart 200 may proceed to operation 250, involving the content rendering the additional API data. If the APIs are not protected, then the flowchart may proceed directly from operation 244 to operation 250. Following operation 250 may again be operation 256 involving the customer viewing or taking action on the content. Once the user is finished with the content, the user may provide an indication to "push" the document back to the host device, including any changes made to the document by the user on the connected device. Similarly, at any time, the user of the host device may provide an indication to "pull" the document from the connected device. That is, the document may cease to be displayed on the connected device, may be transmitted to the host device, and may be displayed on the host device. In some instances, however, the document may simultaneously be displayed on the host device and/or the connected device at the same time. In such cases, the user of the host device may also have the option of indicating that the document should cease to be displayed on the connected device as well. It should be noted that any of the operations or conditions described with respect to flowchart 200 may be performed in series or in parallel. For example, any of the operations described with respect to the first sub-flow 202 associated with the host device may be performed in series or parallel with the operations described with respect to the second sub-flow 204 associated with the connected device.

Figure 3A:
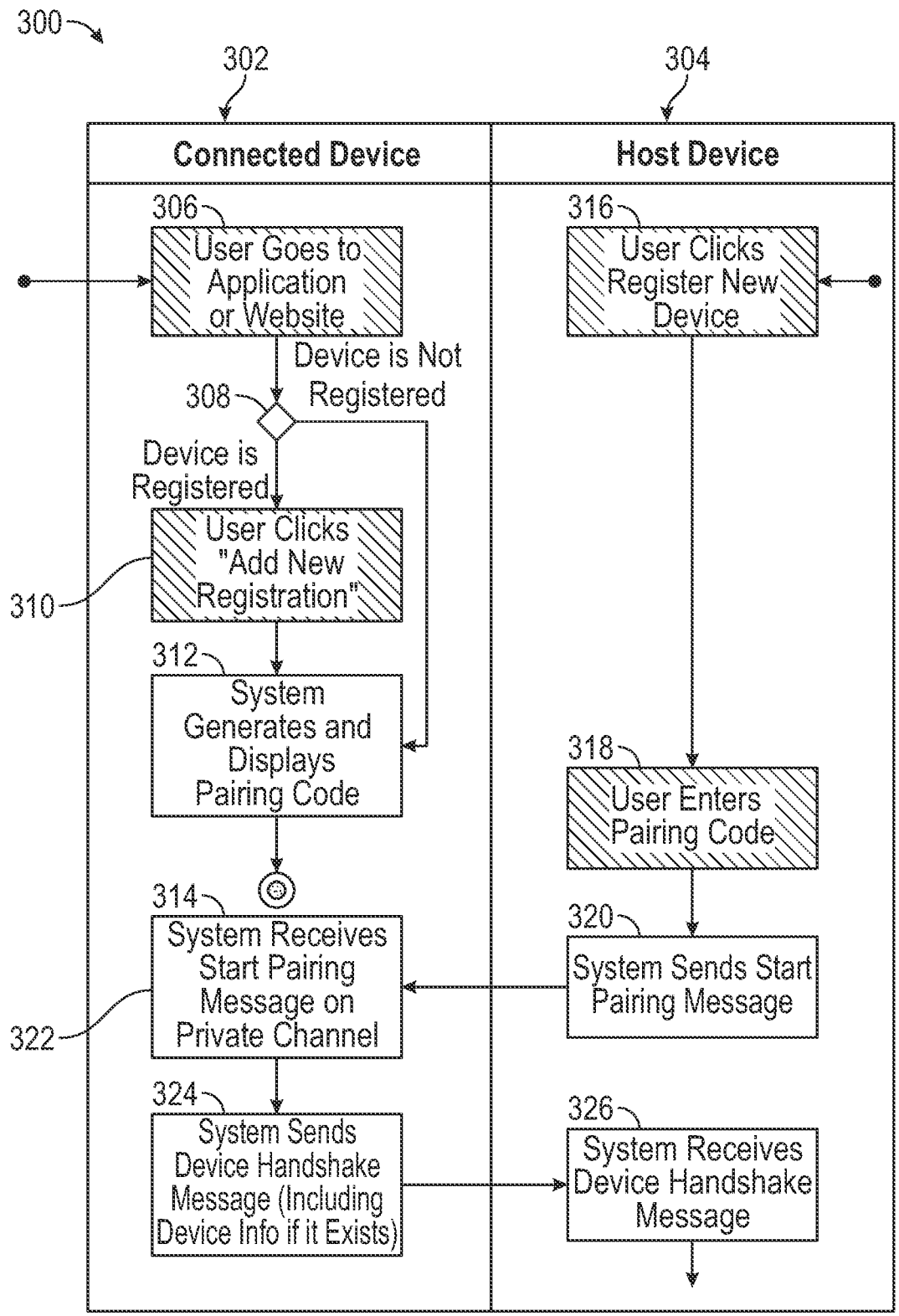
FIG. 3A depicts a device registration system flowchart, in accordance with one or more example embodiments of the disclosure.

FIG. 3A depicts a device registration system flowchart 300. In some embodiments, the registration may be for the connected device referenced with respect to FIG. 1 (for example, registering a connected device to one or more host devices). The registration process described with respect to FIG. 3A and below-described FIG. 3B may also represent the registration process referred to in operation 224 of FIG. 2. Similar to flowchart 200, flowchart 300 may involve multiple sub-flows. For example, flowchart 300 may include a first sub-flow 302 associated with the connected device and a second sub-flow 304 associated with the host device. The host device and connected device referred to in FIGS. 3A-3B may be the same as the host device and connected device referred to in FIGS. 2A-2B.

In some embodiments, the flowchart 300 may begin with operation 306, involving the user opening the digital document-sharing application or website. The flowchart 300 may proceed with condition 308, which may involve a determination as to whether a connected device is registered with the host device. A connected device being registered to a host device may mean that the host device is already capable of sending content to the connected device. Once a given connected device is registered with the host device, this registration may be stored and maintained so that the host device may be capable of providing content to the connected device in future document-sharing sessions as well. Additionally, the host device may be registered to multiple connected devices at the same time, such that a user of the host device may select any (or multiple) connected devices to provide content to at any given time. If it is determined at condition 308 that the connected device is not registered to the host device, then the flowchart 300 may proceed to operation 310. Otherwise, the flowchart may proceed to operation 312. Operation 310 may involve the connected device receiving a user selection of an option to add a new registration (or any other type of indication that a new connected device should be registered with the host device). Following receipt of this selection (or other indication), the flowchart may also proceed to operation 312. In operation 312, a pairing code may be generated and displayed at the connected device. Once the pairing code is generated at operation 312, operation 318 of the second sub-flow 304 associated with the host device may involve receiving the pairing code at the host device. That is, a user may enter the pairing code generated and displayed at the connected device into the host device. Once the pairing code is entered on the host device and is verified as being the correct generated pairing code, a handshake process may occur, which may begin with operation 320. At operation 320, the handshake process may involve the host device sending a message to the connected device to initiate a pairing process between the host device and the connected device. At operation 322, the connected device may receive the message from the host device. At operation 324, the connected device may then send a second message to the host device. The second message may include device information pertaining to the connected device (for example, device name, device type, or any other types of identifying information). At operation 326, the host device may receive the second message from the connected device.

Figure 3B:
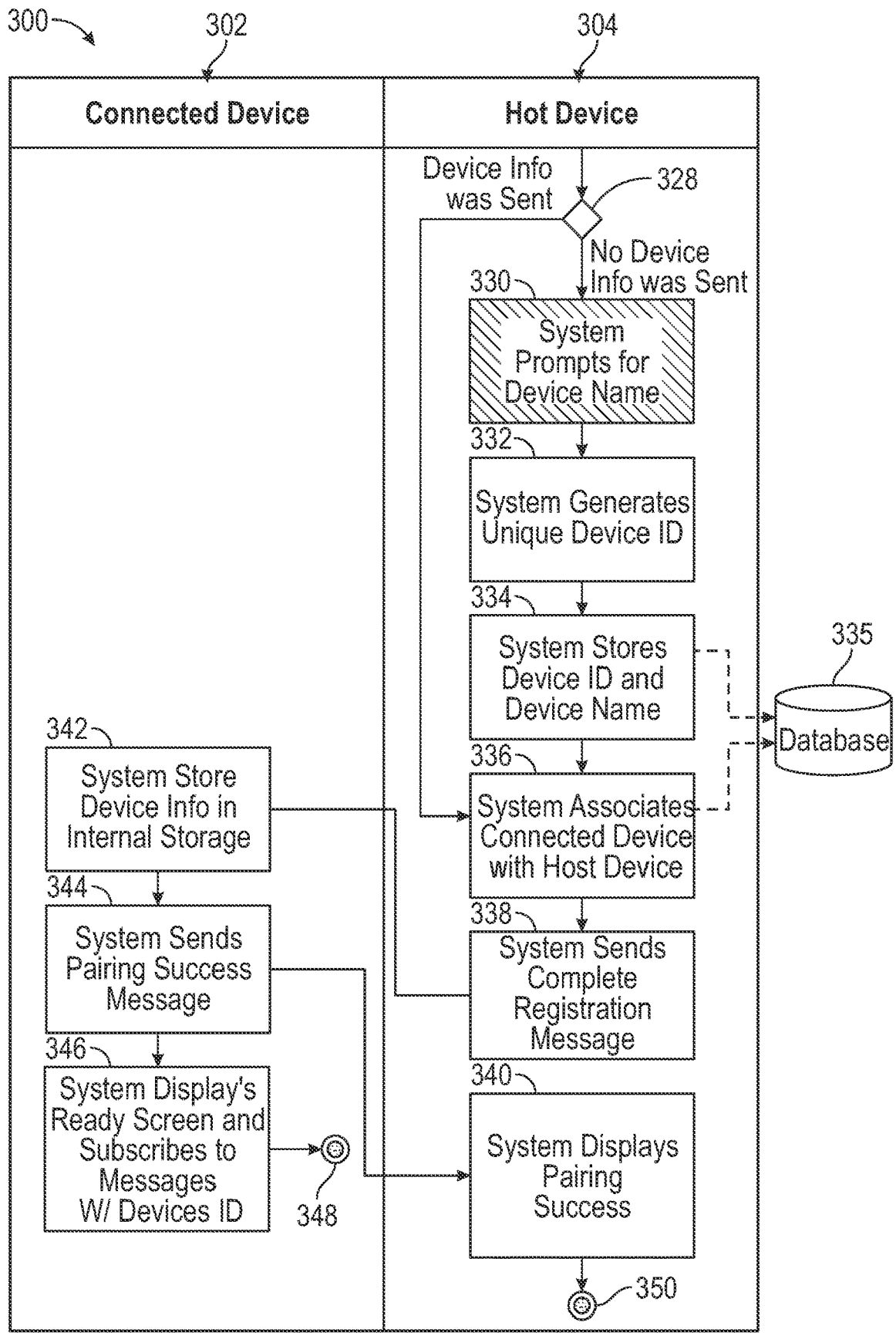
FIG. 3B depicts a continuation of the device registration system flowchart depicted in FIG. 3A, in accordance with one or more example embodiments of the disclosure.

Continuing with FIG. 3B (which may be a continuation of flowchart 300), condition 328 may involve a determination as to whether device information (for example, device information pertaining to the connected device) was provided to the host device. If no device information was provided, then, at operation 330, the connected device may be prompted to provide such information. Subsequently, at operation 332, the host device may then generate a unique device identification for the connected device. The unique device identification may be, for example, a unique random identifier. [At operation 334, the device identification value may be saved by the host device or stored at any other alternative location (for example, a database 335). The flowchart may then proceed to operation 336. The flowchart 300 may also proceed directly to operation 336 from condition 328 if it is determined that the connected device did provide the information to the host device already. At operation 336, the connected device may be associated with the host device (for example, creating the "link" between the connected device and the host device). Following operation 336, operation 338 may involve the host device sending a completed registration message to the connected device. At operation 342, the connected device may store device information in internal storage. The connected device may then send a pairing success message back to the host device at operation 334. After receiving the pairing success message, the host device, at operation 340, may display a pairing success message on the host device. Finally, at operation 346, the connected device may display a ready screen and may subscribe to messages with the device ID. It should be noted that any of the operations or conditions described with respect to flowchart 300 may be performed in series or in parallel. For example, any of the operations described with respect to the first sub-flow 302 associated with the connected device may be performed in series or parallel with the operations described with respect to the second sub-flow 304 associated with the host device. Furthermore, in some instances, operations being described as being performed at the connected device can also be performed at the host device and vice versa.

Figure 4:
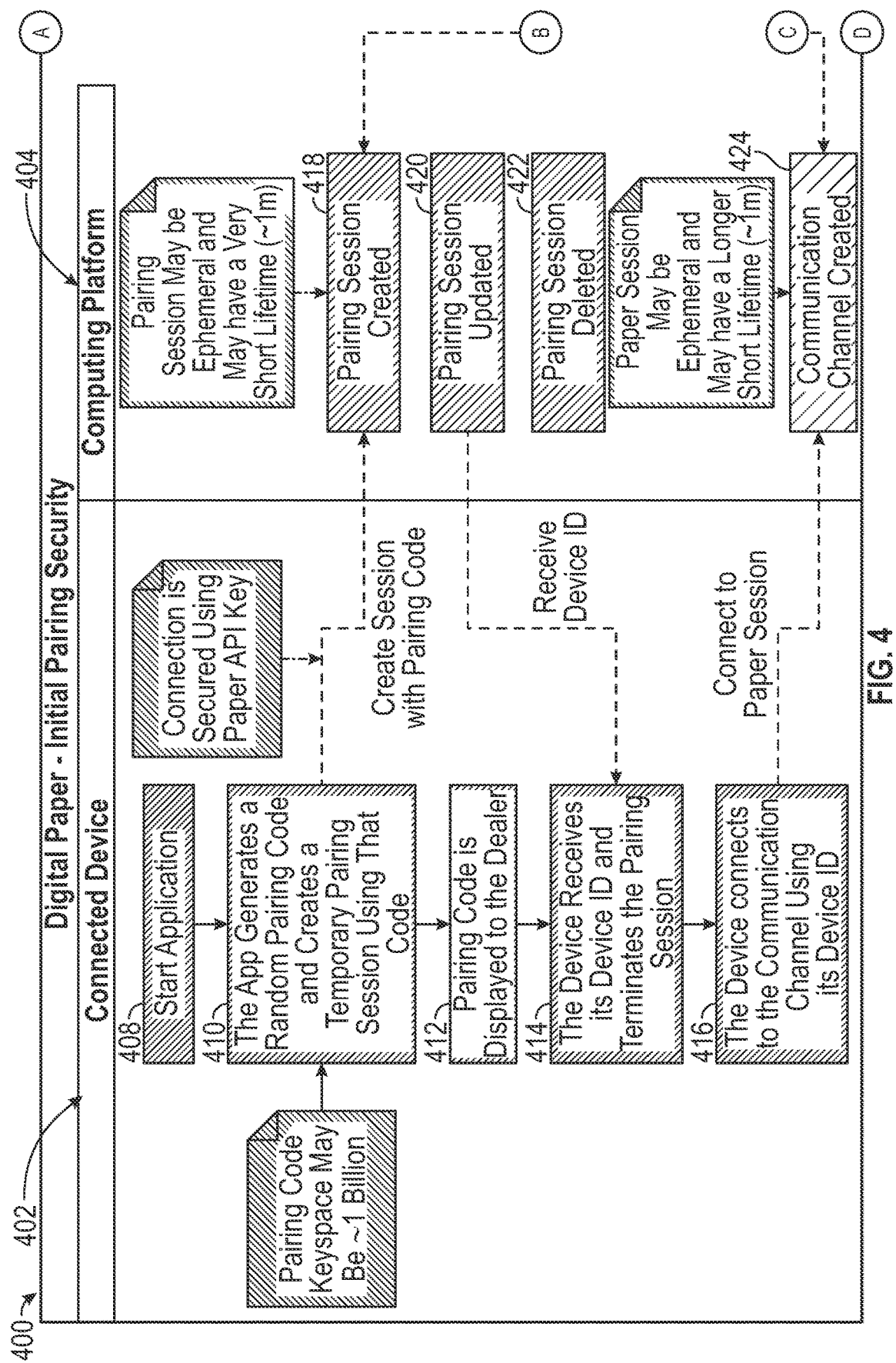
FIG. 4 depicts a pairing security flowchart, in accordance with one or more example embodiments of the disclosure.
Figure 4:
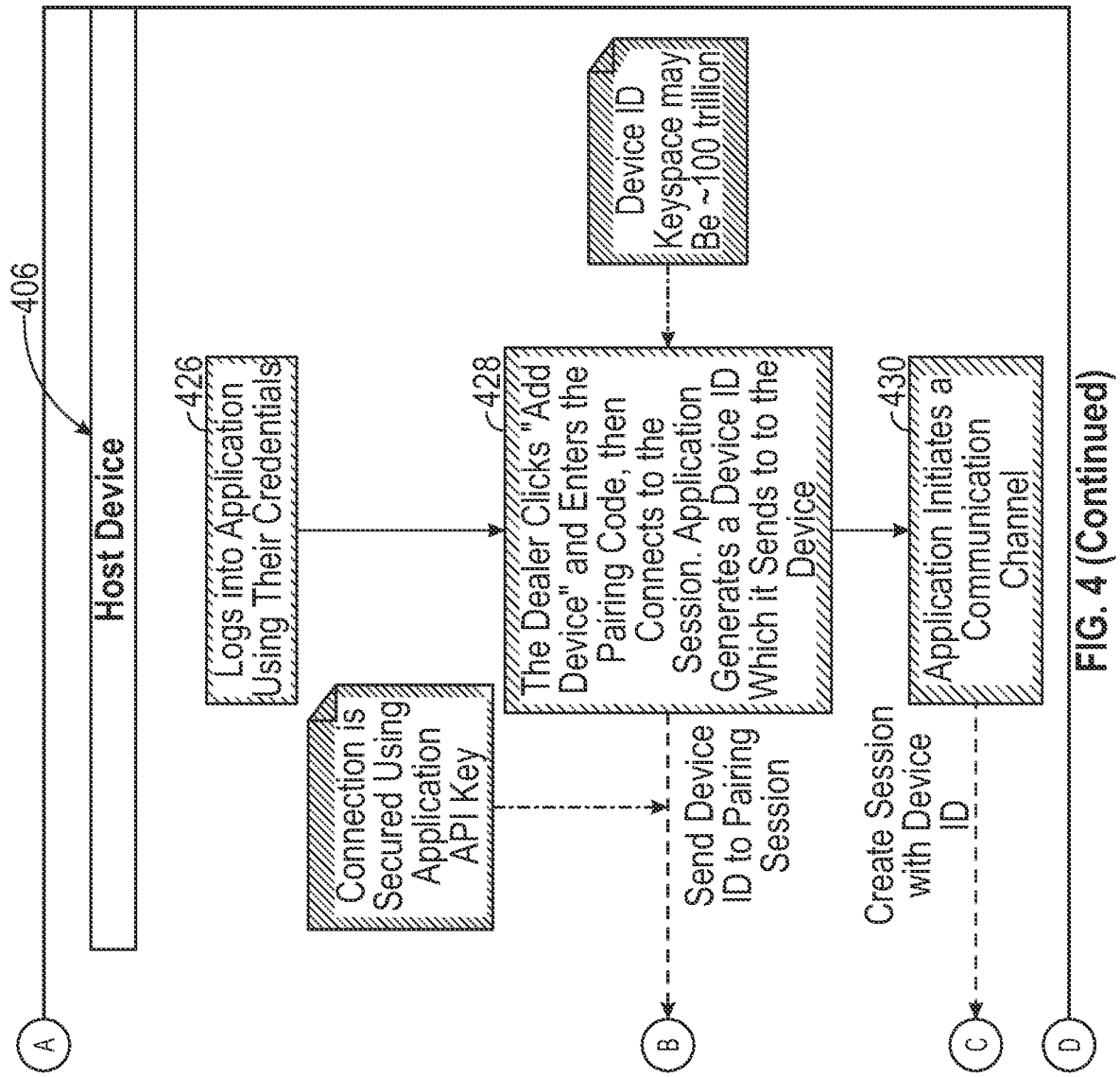

In some embodiments, FIG. 4 may depict a pairing security flowchart 400. The pairing security flowchart 400 may depict the interactions of three elements that may take place when registering a new device (for example, a connected device) to connect to a given host device (however, in some instances, any other number of elements may also interact as well). For example, the three elements may include an application (or website) run on the host device, a computing platform (which may be, for example, a cloud computing platform or otherwise), and an application (or website) run on the device to be connected to the host device. More specifically, the flowchart 400 may provide additional details regarding the pairing process between a connected device and a host device, including security aspects of such pairing. The flowchart may also include one or more sub-flows associated with some or all of the elements involved in the pairing security. For example, a first sub-flow 402 may be associated with the connected device, a second sub-flow 404 may be associated with the computing platform (or any other type of computing platform), and/or a third sub-flow 406 may be associated with the host device. Operations described as taking place within each of these sub-flows may take place in series, or, in some instances, in parallel as well.

Beginning with the first sub-flow 402 associated with the connected device, at operation 408, an application or website may be initiated at the connected device. may be started, and a random pairing code and a pairing session using the pairing code may be generated. The flowchart 400 may proceed with operation 410, which may involve the generation of a pairing code and a temporary pairing session using the generated pairing code. The pairing code may be, for example, an alphanumeric code. A pairing session may be, for example, a period of time during which the connected device is listening for a "start pairing message" from the host device. In some instances, the pairing code may be randomly generated. Additionally, the pairing code keyspace may be approximately one billion in some cases. In conjunction with operation 410 at the connected device, operation 418 may take place at the computing platform, and may involve creating the pairing session at the computing platform as well. This connection between the connected device and the computing platform may be secured using an API key. Subsequently, operation 412 at the connected device may involve the pairing code being displayed. For example, the pairing code may be displayed on the connected device so that it may be entered on the host device by the user who is initiating the pairing. At this point, the connected device may await a pairing connection from the host device.

Turning to the sub-flow 406 associated with the host device, an application or website may be accessed at the host device at operation 426. At operation 428, the pairing code may be entered into the host device through the application or website, and the host device may connect to the pairing session established at the computing platform by the connected device. The application or website may then generate a device identification, which may be provided to the computing platform. Subsequently, the pairing session may be updated at the computing platform at operation 420, and the computing platform may provide the device identification from the host device to the connected device. The connection between the host device and the computing platform may also be secured using the API key. Once the computing platform receives the device identification from the host device, it may provide the device identification to the connected device, which may receive the device identification at operation 414. Operation 414 may also involve the connected device terminating the pairing session. In conjunction with the termination, the pairing session may be deleted from the computing platform at operation 422.

Following the termination of the pairing session at the computing platform, the host device, at operation 430, may create a communication channel for use by the connected device and the host device to allow for communications between the two devices. At operation 424, the computing platform may initiate this communication channel at the direction of the host device through operation 430. Finally, at operation 416, the connected device may connect to the communication channel using its device identification, and may use the communication channel to communicate with the host device.

Figure 5:
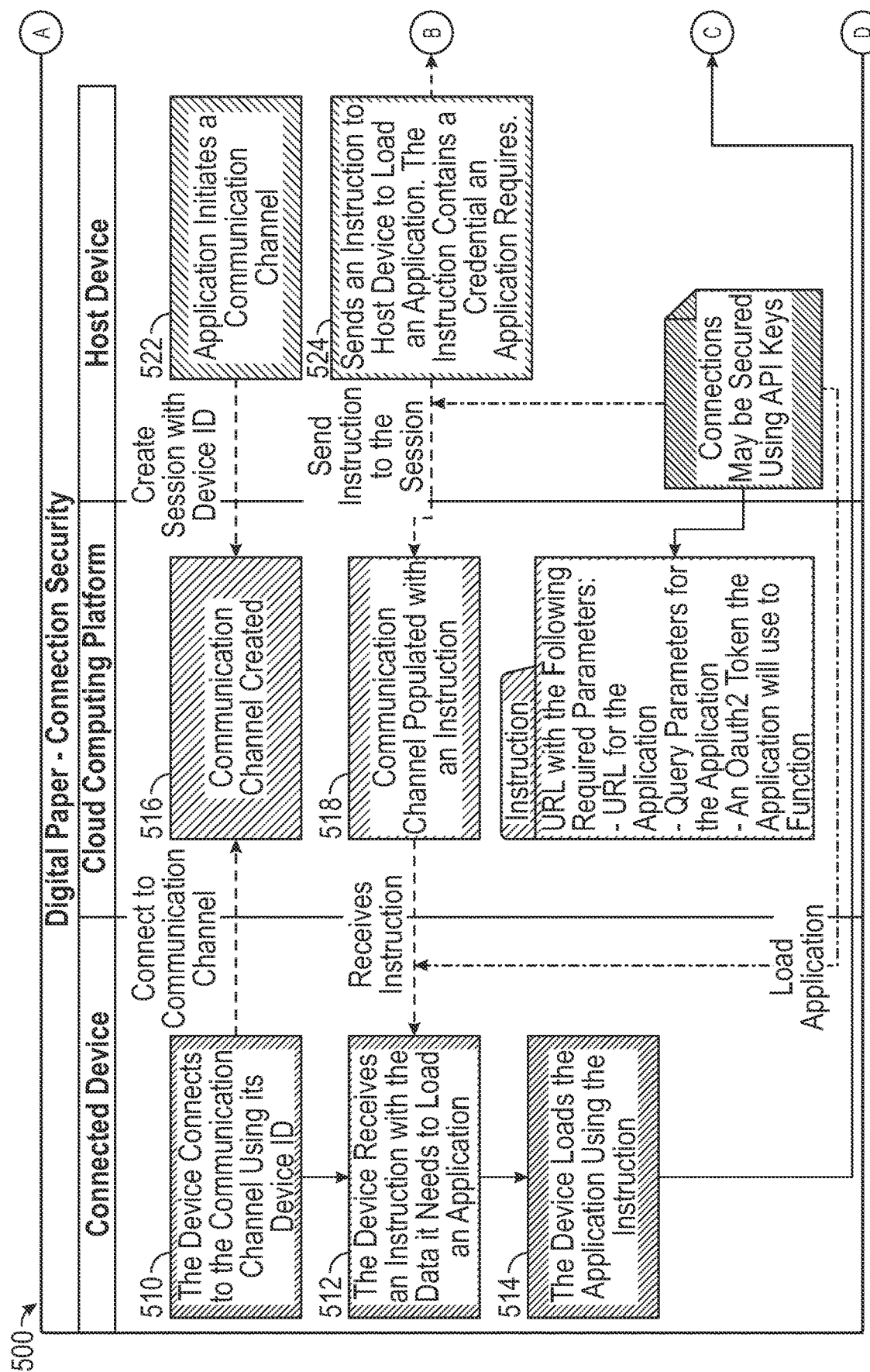
FIG. 5 depicts a connection security flowchart, in accordance with one or more example embodiments of the disclosure.
Figure 5:
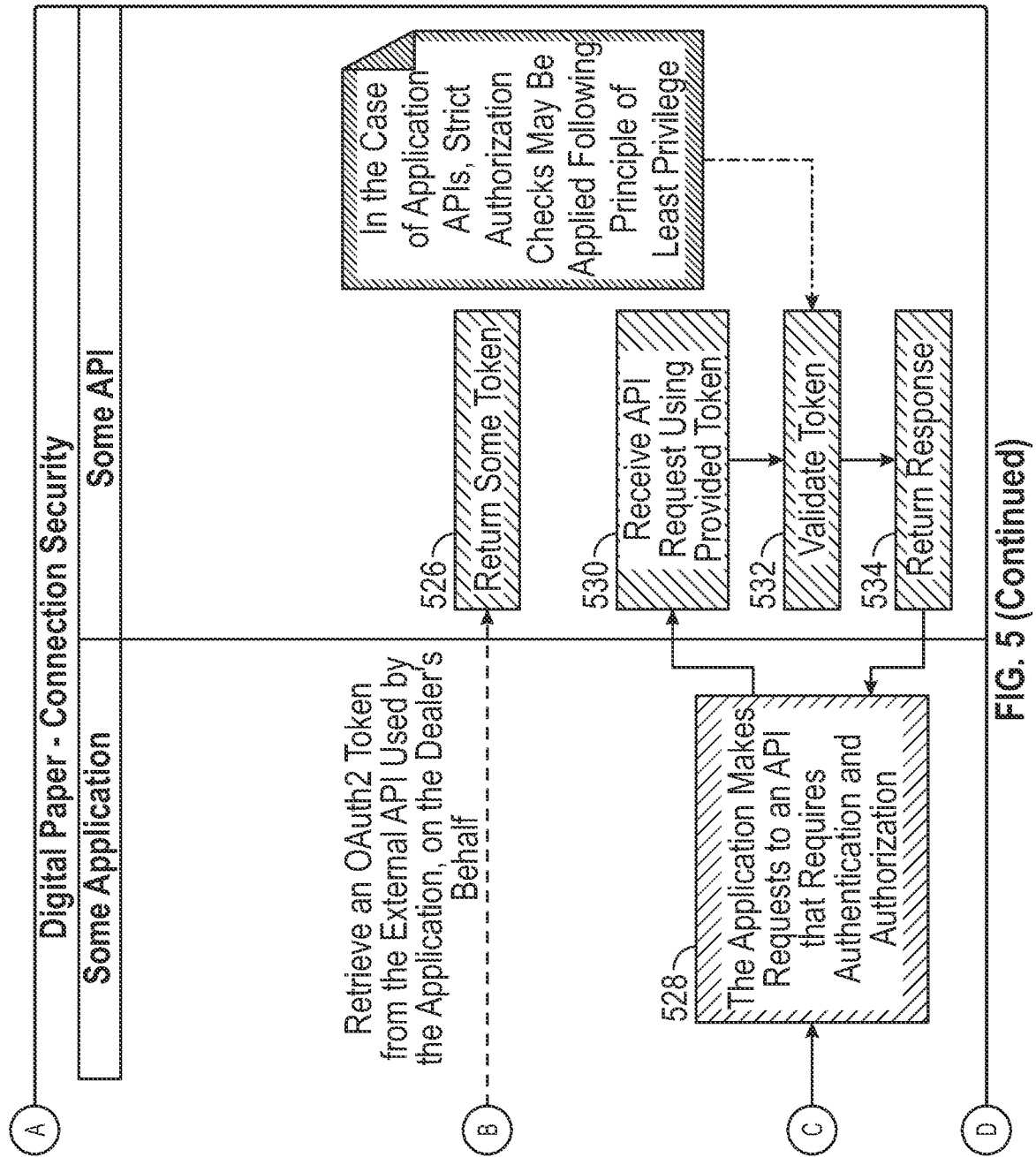

FIG. 5 depicts a connection security flowchart 500. The connection security flowchart 500 may depict the interactions of five elements that may take place when a connection may be active or will be active with an external application (for example, when an external application is called to provide content to a connected device by a host device). In some embodiments, any number of other elements may interact (for example, less or more than five elements). In some instances, the five elements may include an application run on the host device, a computing platform, an application run on a connected device, an external application, and an API associated with the external application. The flowchart 500 may begin with operation 522 at the host device, which may involve an application or website initiating a communication channel. Any of the communications described in the flowchart 500 may be secured using API keys. The creation of the communication channel in flowchart 500 may be performed in a similar manner to which the communication channel is created in flowchart 400. For example, at operation 516, the communication channel may then be created at the computing platform. Additionally, at operation 510, the connected device may then connect to the communication channel using its device identification. Continuing with the host device operations, operation 524 may involve the host device sending an instruction to the host device to load an application. This instruction may include a credential that an application or website may require. In some instances, the instruction may include a URL, query parameters for the application or website, and/or the token the application and/or website may use to function. Operation 524 may also include requesting a token from the external API used by the application or the website. The API may return a token at operation 526. The instruction may be received by the computing platform, and the communication channel may be populated with the instruction at operation 518. The instructions may be sent to the connected device. From the perspective of the connected device, at operation 512, the connected device may receive the instruction, which may include the data the connected device needs to load the application or website. Continuing with operation 514, the connected device may load the application or website using the instructions. The application and/or website may then be loaded. Subsequently, the flowchart 500 may continue with operation 528, which may involve the application or website making a request to the external API that may require authentication and/or authorization. At operation 530, the external API may receive the requests using the provided token. The external API, at operation 532, may then validate the token and return a response at operation 534. In some instances, strict authorization checks may be applied following the principle of least privilege.

It should be noted that while operations described herein may involve one example embodiment of a flow, any other combinations are possible. For example, in one flowchart, an operation may be described as involving a flow from a host device to a connected device, whereas a flow from the connected device to the host device is also possible.

Figure 6:
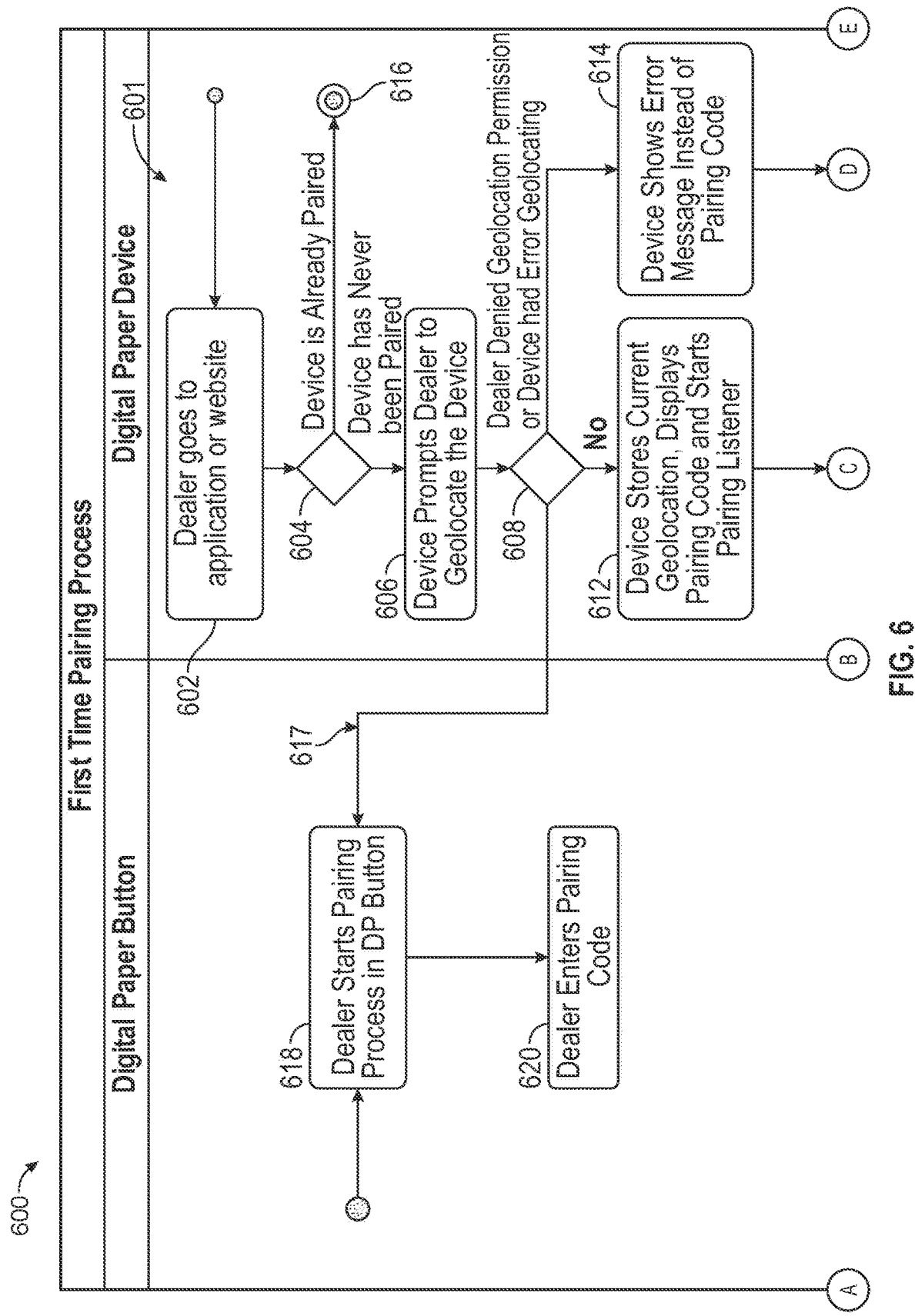
FIG. 6 depicts a geo-located-based device pairing flowchart, in accordance with one or more example embodiments of the disclosure.
Figure 6:
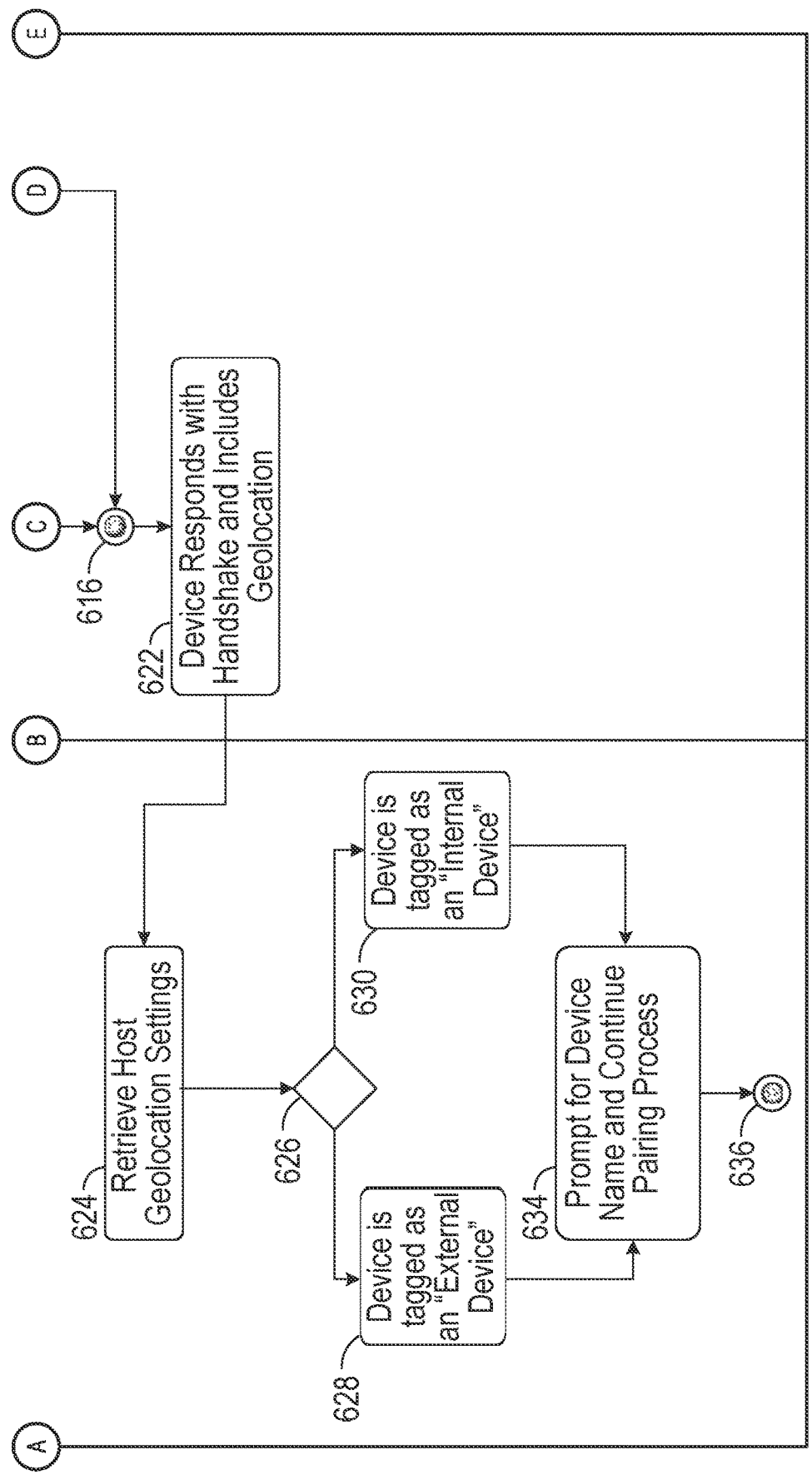

FIG. 6 depicts a geo-located-based device pairing flowchart 600. Flowchart 600 may depict two sub-flows, including at least sub-flow 601 and sub-flow 617. In some instances, sub-flow 601 may be a flowchart that relates to obtaining a geo-location for a connected device in order to identify whether the connected device is inside or outside a given geo-fence region associated with a given location. As one example, the geo-location described below may refer to a vehicle dealership location, and the geo-fence may be a region around the geo-location of the vehicle dealership. Continuing this example, it may be determined whether the connected device is within the defined geo-fence of the dealership. This determination may be used for a number of purposes, such as allowing for further control over the security of the interaction between the host device and connected device, or so that (in the use case involving a vehicle dealership) different transaction fees may be charged based on the geo-location of the connected device. Sub-flow 617 may be a flowchart that relates to a geo-fencing process that may occur after the geo-location for the device is obtained. Beginning with sub-flow 601, operation 602 may involve the user opening the application or website. The sub-flow 601 may then proceed to condition 604, which may determine whether the device has already been paired or if the device has never been paired before in the past. If the device has already been paired, then the sub-flow 601 may proceed to operation 616, which may include the end of the sub-flow 601. However, if the device has never been paired, then the sub-flow 601 may proceed to operation 606. Operation 606 may include the device prompting the user to geo-locate the device. Following operation 606, the sub-flow 601 may proceed to condition 608, which may involve a determination as to whether the device is able to be geo-located. If it is determined in condition 608 that the device is unable to be geo-located, then the sub-flow 601 may proceed to operation 614. However, if the device is able to be geo-located, then the sub-flow 601 may proceed to operation 612. The device may not be able to be geo-located for any number of reasons. For example, if the user is denied geo-location permission for the device or the device experiences an error in geo-location. At operation 612, the device may obtain and store its current geo-location. The device may also display a pairing code and may also initiate a pairing listener sequence. At operation 614, the device may display an indication that there was an error in the geo-location and may not display a pairing code to the user. In such cases, the user may then attempt again to obtain the geo-location for the device.

Continuing with sub-flow 617, operation 618 may involve initiating the pairing process. Operation 620 may involve the user entering the pairing code received in operation 612 after the geo-location was obtained for the device. Following operation 620, operation 622 may involve the device responding with a handshake process that includes the geo-location information determined in sub-flow 601. Following operation 622, operation 624 may involve retrieving geo-location settings for the location (for example, settings pertain to whether geo-location is enabled). Associated with operation 624 may be condition 626, which may involve a geo-fencing determination. The geo-fencing determination may include a determination as to whether the geo-location of the device is within a particular geo-fence of the geo-location. The geo-fence may be a geographical boundary surrounding the geo-location. For example, the geo-fence may extend a certain radius outwards from the geo-location such that the geo-fence refers to the circumference of an imaginary circle surrounding the geo-location. However, this is merely an example; any geo-fence may similarly refer to any other type of defined boundary area of any shape and/or size. The distance the geo-fence is from the geo-location may also be any distance. If it is determined in condition 626 that the device is not within the established geo-fence, then the sub-flow 617 may proceed to operation 628. However, if it is determined that the device is within the established geo-fence, then the device may proceed to operation 630. Operation 628 may involve determining that the device is an external device, and tagging the device as such. An external device may refer to a device located outside the geo-fence. Operation 630 may involve determining that the device is an internal device, and tagging the device as such. An internal device may refer to a device located inside the geo-fence. Finally, operation 634 may involve prompting the device for a device name and continue the pairing process.

Figure 7:
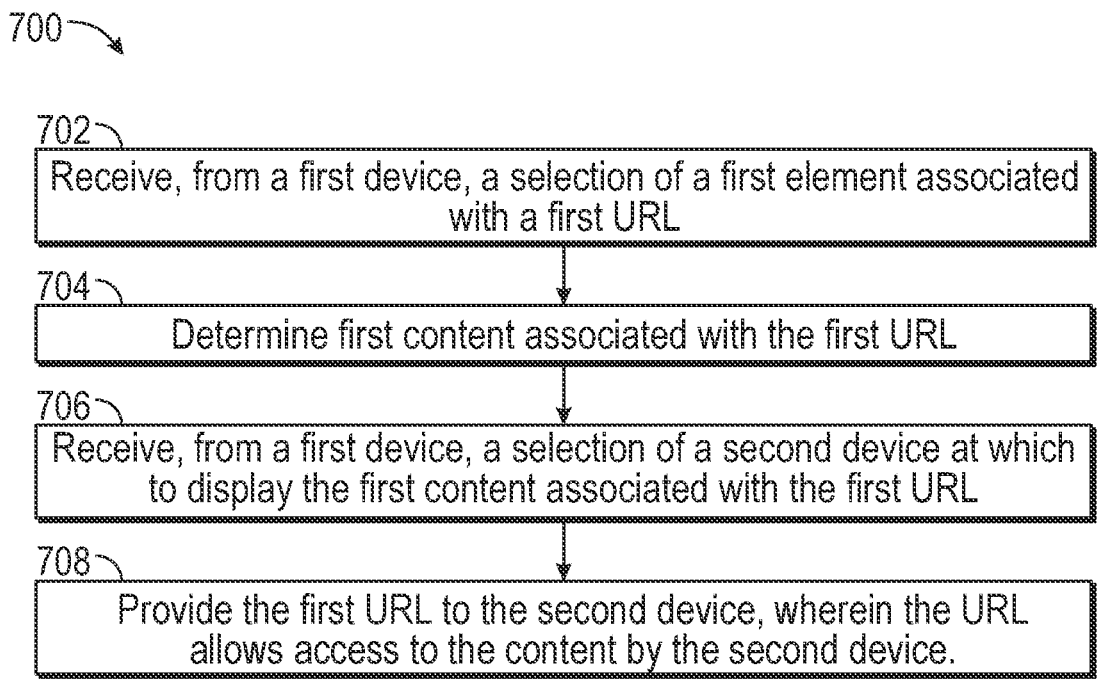
FIG. 7 depicts a flowchart of an example method, in accordance with one or more example embodiments of the disclosure.

FIG. 7 is a flow of an example method 700 of the present disclosure. In some embodiments, the method includes a step 702 of receive, from a first device, a selection of a first element associated with a first URL. In some embodiments, the method includes a step 704 of determining the first content associated with the first URL. In some embodiments, the method includes a step 706 of receiving, from the first device, a selection of a second device at which to display the first content associated with the first URL. In some embodiments, the method includes a step 708 of providing the first URL to the second device, providing the first URL to the second device, wherein the URL allows access to the content by the second device.

The operations described and depicted in the illustrative process flow of FIGS. 2-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-7 may be performed.

Figure 8:
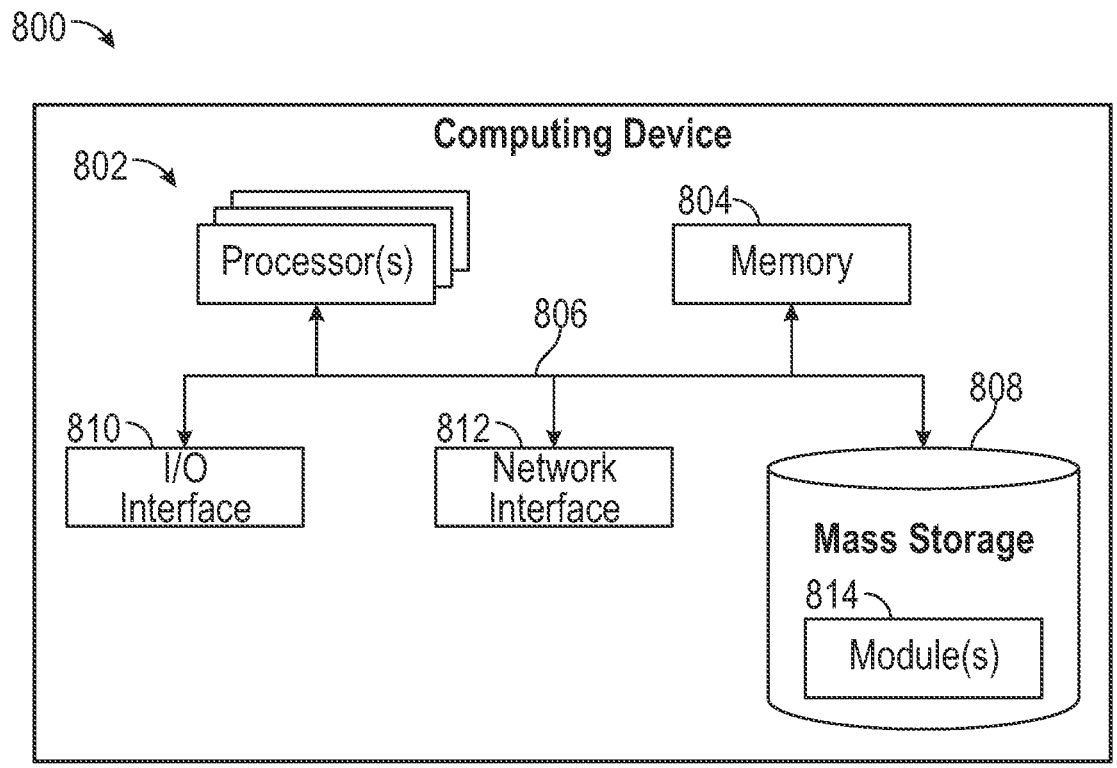
FIG. 8 depicts an example computing device, in accordance with one or more example embodiments of the disclosure.

FIG. 8 illustrates an example computing device 800, in accordance with one or more embodiments of this disclosure. The computing 800 device may be representative of any number of elements described herein, such as any of the host devices 102, connected devices 104, servers 106, or any other element described herein. The computing device 800 may include at least one processor 802 that executes instructions that are stored in one or more memory devices (referred to as memory 804). The instructions can be, for instance, instructions for implementing functionality described as being carried out by one or more modules and systems disclosed above or instructions for implementing one or more of the methods disclosed above. The processor(s) 802 can be embodied in, for example, a CPU, multiple CPUs, a GPU, multiple GPUs, a TPU, multiple TPUs, a multi-core processor, a combination thereof, and the like. In some embodiments, the processor(s) 802 can be arranged in a single processing device. In other embodiments, the processor(s) 802 can be distributed across two or more processing devices (e.g., multiple CPUs, multiple GPUs, a combination thereof, or the like). A processor can be implemented as a combination of processing circuitry or computing processing units (such as CPUs, GPUs, or a combination of both). Therefore, for the sake of illustration, a processor can refer to a single-core processor, a single processor with software multithread execution capability, a multi-core processor; a multi-core processor with software multithread execution capability, a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (e.g., manufactured) to perform the functions described herein.

The processor(s) 802 can access the memory 804 by means of a communication architecture 806 (e.g., a system bus). The communication architecture 806 may be suitable for the particular arrangement (localized or distributed) and type of the processor(s) 802. In some embodiments, the communication architecture 806 can include one or many bus architectures, such as a memory bus or a memory controller, a peripheral bus, an accelerated graphics port, a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage, or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms, such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory. In addition to storing executable instructions, the memory 804 also can retain data.

Each computing device 800 also can include mass storage 808 that is accessible by the processor(s) 802 by means of the communication architecture 806. The mass storage 808 can include machine-accessible instructions (e.g., computer-readable instructions and/or computer-executable instructions). In some embodiments, the machine-accessible instructions may be encoded in the mass storage 808 and can be arranged in components that can be built (e.g., linked and compiled) and retained in computer-executable form in the mass storage 808 or in one or more other machine-accessible non-transitory storage media included in the computing device 800. Such components can embody, or can constitute, one or many of the various modules disclosed herein. In some instances, the modules may also be included within the memory 804 as well.

Execution of the modules 814, individually or in combination, by at least one of the processor(s) 802, can cause the computing device 800 to perform any of the operations described herein (for example, the operations described with respect to FIGS. 2-8, as well as any other operations).

Each computing device 800 also can include one or more input/output interface devices 810 (referred to as I/O interface 810) that can permit or otherwise facilitate external devices to communicate with the computing device 800. For instance, the I/O interface 810 may be used to receive and send data and/or instructions from and to an external computing device.

The computing device 800 also includes one or more network interface devices 812 (referred to as network interface(s) 812) that can permit or otherwise facilitate functionally coupling the computing device 800 with one or more external devices. Functionally coupling the computing device 800 to an external device can include establishing a wireline connection or a wireless connection between the computing device 800 and the external device. The network interface devices 812 can include one or many antennas and a communication processing device that can permit wireless communication between the computing device 800 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 812 may also be used to facilitate peer-to-peer ad-hoc network connections as described herein.

In the above disclosure, reference may be made to the accompanying drawings, which form a part hereof, and illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Computer-executable instructions comprise, for example, instructions and data which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the features or acts described above. Rather, the described features and acts are disclosed as example forms of implementing the claims.

While various embodiments of the present disclosure may be described below, it should be understood that they have been presented by way of example only and not by limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
a processor; and
a memory storing computer-executable instructions that when executed by the processor, cause the processor to:
receive, from a first device at a vehicle dealership, a selection of a first element associated with a first URL and a second element associated with a second URL;
determine first content associated with the first URL and second content associated with the second URL, wherein the first content and second content are different;
receive, from the first device, a selection of a second device at the vehicle dealership at which to display the first content and a third device at the vehicle dealership at which to display the second content;
determine that the second device is unpaired with the first device;
determine that the second device is within a geo-fence of the first device, wherein the geo-fence is within the vehicle dealership;
pair, based on the determination that the second device is within the geo-fence, the first device and the second device;
provide the first URL to the second device and the second URL to the third device, wherein the first URL allows access to the content by the second device, and wherein the second URL allows access to the content by the third device;
simultaneously display the first content on the second device and the second content at the third device;
present an indication to the first device that one or more users are interacting with the first content being presented on the second device and the second content being presented on the third device;
receive, from the first device, a request to cease display of the first content on the second device; and
cease display of the first content on the second device, wherein the second content remains displayed on the third device.

2. The system of claim 1, wherein the first content is stored on a remote server or the first device, and a window is provided to access the first content on the remote server or the first device through the second device.

3. The system of claim 1, wherein the computer-executable instructions are further operable to:
receive, from the first device, a request to register a new device;
generate, based on the request to register the new device, a first pairing code;

receive, from a third device, a second pairing code provided at the third device;

determine that the first pairing code and the second paring code are identical; and register, based on the determination that the first pairing code and the second paring code are identical, the third device with the first device.

4. The system of claim 1, wherein the computer-executable instructions are further operable to:

determine that the first URL is a secured URL;

generate, based on the determination that the first URL is a secured URL, a token; and add the token to the first URL.

5. The system of claim 1, wherein the computer-executable instructions are further operable to:

receive a modification to the first content by the second device; and update the first content to reflect the modification by the second device.

6. A method comprising:

receiving, from a first device, a selection of a first element associated with a first URL and a second element associated with a second URL;

determining a first content associated with the first URL and second content associated with the second URL, wherein the first content and second content are different;

receiving, from the first device, a selection of a second device at which to display the first content and a third device at which to display the second content;

determining that the second device is unpaired with the first device;

determining that the second device is within a geo-fence of the first device;

pairing, based on the determination that the second device is within the geo-fence, the first device and the second device;

providing the first URL to the second device and the second URL to the third device, wherein the first URL allows access to the content by the second device and wherein the second URL allows access to the content by the third device;

simultaneously displaying the first content on the second device and the second content at the third device;

presenting an indication to the first device that one or more users are interacting with the first content being presented on the second device and the second content being presented on the third device;

receiving, from the first device, a request to cease display of the first content on the second device; and ceasing display of the first content on the second device, wherein the second content remains displayed on the third device.

7. The method of claim 6, wherein the first content is stored on a remote server or the first device, and a window is provided to access the first content on the remote server or the first device through the second device.

8. The method of claim 6 further comprising:

receiving, from the first device, a request to register a new device;

generating, based on the request to register the new device, a first pairing code;

receiving, from a third device, a second pairing code provided at the third device;

determining that the first pairing code and the second paring code are identical; and registering, based on the determination that the first pairing code and the second paring code are identical, the third device with the first device.

9. The method of claim 6, further comprising:

determining that the first URL is a secured URL;

generating, based on the determination that the first URL is a secured URL, a token; and adding the token to the first URL.

10. The method of claim 6, further comprising:

receiving a modification to the first content by the second device; and updating the first content to reflect the modification by the second device.

11. A non-transitory computer-readable medium including computer-executable instructions stored thereon, which when executed by one or more processors, cause the one or more processors to perform operations of:

receiving, from a first device, a selection of a first element associated with a first URL and a second element associated with a second URL;

determining a first content associated with the first URL and second content associated with the second URL, wherein the first content and second content are different;

receiving, from the first device, a selection of a second device at which to display the first content associated with the first URL and a third device at which to display the second content;

determining that the second device is unpaired with the first device;

determining that the second device is within a geo-fence of the first device;

pairing, based on the determination that the second device is within the geo-fence, the first device and the second device;

providing the first URL to the second device and the second URL to the third device, wherein the first URL allows access to the content by the second device and wherein the second URL allows access to the content by the third device;

simultaneously displaying the first content on the second device and the second content at the third device;

presenting an indication to the first device that one or more users are interacting with the first content being presented on the second device and the second content being presented on the third device;

receiving, from the first device, a request to cease display of the first content on the second device; and ceasing display of the first content on the second device, wherein the second content remains displayed on the third device.

12. The non-transitory computer-readable medium of claim 11, wherein the first content is stored on a remote server or the first device, and a window is provided to access the first content on the remote server or the first device through the second device.

13. The non-transitory computer-readable medium of claim 11, wherein the computer-executable instructions further cause the one or more processors to perform operations of:

receiving, from the first device, a request to register a new device;

generating, based on the request to register the new device, a first pairing code;

receiving, from a third device, a second pairing code provided at the third device;

determining that the first pairing code and the second paring code are identical; and registering, based on the determination that the first pairing code and the second paring code are identical, the third device with the first device.

14. The non-transitory computer-readable medium of claim 11, wherein the computer-executable instructions further cause the one or more processors to perform operations of:

determining that the first URL is a secured URL;

generating, based on the determination that the first URL is a secured URL, a token; and adding the token to the first URL.

\* \* \* \* \*